United States Patent
Shao

(10) Patent No.: US 11,555,720 B2
(45) Date of Patent: *Jan. 17, 2023

(54) GAS LEAKAGE DETECTION METHOD BASED ON COMPOUND INTERNET OF THINGS (IOT) AND IOT SYSTEM

(71) Applicant: Chengdu Qinchuan IOT Technology Co., Ltd., Chengdu (CN)

(72) Inventor: Zehua Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/552,751

(22) Filed: Dec. 16, 2021

(65) Prior Publication Data
US 2022/0107211 A1    Apr. 7, 2022

Related U.S. Application Data

(63) Continuation of application No. 16/366,965, filed on Mar. 27, 2019, now Pat. No. 11,237,030.

(51) Int. Cl.
| | |
|---|---|
| *G01D 18/00* | (2006.01) |
| *G01M 3/00* | (2006.01) |
| *G05B 19/042* | (2006.01) |
| *G01D 4/00* | (2006.01) |

(52) U.S. Cl.
CPC .............. *G01D 18/00* (2013.01); *G01D 4/002* (2013.01); *G01M 3/00* (2013.01); *G05B 19/042* (2013.01); *G05B 2219/25297* (2013.01)

(58) Field of Classification Search
CPC ......... G01D 18/00; G01D 4/002; G01M 3/00; G05B 19/042
USPC .................................................. 700/156, 282
See application file for complete search history.

(56) References Cited

U.S. PATENT DOCUMENTS

| | | | | |
|---|---|---|---|---|
| 2008/0188991 | A1* | 8/2008 | Mulligan | G01M 3/28 700/282 |
| 2012/0105236 | A1* | 5/2012 | Bach | G08B 21/16 73/40 |
| 2017/0146196 | A1* | 5/2017 | Johnson | F17D 5/005 |
| 2018/0286210 | A1* | 10/2018 | Frascati-Robinson | G08B 21/182 |
| 2019/0273784 | A1* | 9/2019 | Shao | H04L 67/562 |

FOREIGN PATENT DOCUMENTS

WO    WO-2018028060 A1 *    2/2018    ............. H04L 67/10

* cited by examiner

*Primary Examiner* — Mohammad Ali
*Assistant Examiner* — Joshua T Sanders
(74) *Attorney, Agent, or Firm* — Getech Law LLC; Jun Ye

(57) ABSTRACT

The present invention relates to the field of Internet of Things (IoT), and provides a gas leakage detection method based on a compound IoT and an IoT system. According to the gas leakage detection method based on the compound IoT and the IoT system provided by the present invention, whether a gas pipeline of a user has gas leakage or not is judged via a user participation manner, the judgment manner is intelligent, the judgment result is accurate and thus the gas safety of the user is guaranteed.

14 Claims, 4 Drawing Sheets

GAS LEAKAGE DETECTION METHOD BASED ON COMPOUND INTERNET OF THINGS (IOT) AND IOT SYSTEM

CROSS-REFERENCE TO RELATED APPLICATION

This application is a continuation of U.S. patent application Ser. No. 16/366,965, filed Mar. 27, 2019, the content of which application is hereby expressly incorporated herein by reference in its entirety.

TECHNICAL FIELD

The present invention relates to the field of Internet of Things (IoT), and in particular to a gas leakage detection method based on a compound IoT and an IoT system.

BACKGROUND

In home safety, the safe use of the gas is a top priority. Nowadays, there are many gas leakage safety accidents almost every year in the world, which results in that the safety for lives and properties of people cannot be guaranteed. In order to take an effective measure after gas leakage, many manners are adopted by the people to detect and judge the gas leakage. At present, the detection of the gas leakage mainly relies on an alarm to detect a concentration of a combustible gas around a gas pipeline, thereby judging whether the gas is leaked or not. With such a manner, the false judgment (misled by other combustible gases) and the omitted judgment (the distance between an installation position of the alarm and a gas leakage position is far) often happen, and as a result, the accuracy of the leakage detection is poor, the potential safety hazard is caused, and the use experience feeling of a user is poor.

SUMMARY OF THE INVENTION

In view of this, an objective of the present invention to provide a gas leakage detection method based on a compound IoT and an IoT system to provide an accurate gas leakage detection mechanism.

To this end, the technical solutions adopted by the present invention are as follows:

According to a first aspect, the present invention provides a gas leakage detection method based on a compound IoT; the method is applied to an IoT system; the IoT system includes a user platform, a management platform, an object platform, a plurality of sensor network sub-platforms and service sub-platforms; the object platform includes a gas meter; the service sub-platforms include at least one of a gas company service sub-platform, a government service sub-platform or a social operator service sub-platform; and the method includes: sending, by the user platform, a detection command to a service sub-platform, where the detection command includes a time period; sending, by the service sub-platform, the detection command to the management platform; sending, by the management platform, a detection instruction to the gas meter via at least one of the plurality of sensor network sub-platforms according to the detection command; in response to the detection instruction, sending, by the gas meter, gas data to the management platform via the sensor network sub-platform at a preset time interval within the time period; judging, by the management platform, whether the gas data uploaded by the gas meter changes or not, and when the gas data changes, judging, by the management platform, whether to send a valve closing instruction to the gas meter or not via at least one of the plurality of sensor network sub-platforms; and when receiving the valve closing instruction, closing, by the gas meter, a valve in response to the valve closing instruction.

Further, the service sub-platforms include at least the gas company service sub-platform and the social operator service sub-platform; and the step of when the gas data changes, judging, by the management platform, whether to send a valve closing instruction to the gas meter or not via at least one of the plurality of sensor network sub-platforms includes: when the time at which the gas data changes falls within a preset time range, sending, by the management platform, the valve closing instruction to the gas meter via at least one of the plurality of sensor network sub-platforms; and sending, by the management platform, prompt information to both the gas company service sub-platform and the social operator service sub-platform.

Further, the service sub-platforms include at least the gas company service sub-platform and the social operator service sub-platform; and the step of judging, by the management platform, whether to send a valve closing instruction to the gas meter or not via at least one of the plurality of sensor network sub-platforms includes: judging, by the management platform, whether or not the amount of change in the gas data is greater than a preset threshold; if the amount of change in the gas data is smaller than the threshold, sending, by the management platform, query information to the user platform via a service sub-platform to query whether a user has used the gas or not, and judging, according to a response of the user platform to the query information, whether to send the valve closing instruction to the gas meter or not via at least one of the plurality of sensor network sub-platforms; if the amount of change in the gas data is greater than the threshold, sending, by the management platform, the valve closing instruction to the gas meter via at least one of the plurality of sensor network sub-platforms; and when the management platform sends the valve closing instruction to the gas meter via at least one of the plurality of sensor network sub-platforms, sending, by the management platform, the prompt information to both the gas company service sub-platform and the social operator service sub-platform.

Further, when the response of the user platform to the query information is that the gas hasn't been used, the management platform sends the valve closing instruction to the gas meter via at least one of the plurality of sensor network sub-platforms.

Further, if the user platform does not make a response to the query information within a preset duration, the management platform sends the valve closing instruction to the gas meter via at least one of the plurality of sensor network sub-platforms.

Further, the service sub-platforms include at least the gas company service sub-platform and the social operator service sub-platform; and the step of judging, by the management platform, whether to send a valve closing instruction to the gas meter or not via at least one of the plurality of sensor network sub-platforms includes: judging, by the management platform, whether the change of the gas data is continuous or not within a preset observation duration; if the change of the gas data is continuous, sending, by the management platform, the valve closing instruction to the gas meter via at least one of the plurality of sensor network sub-platforms; and sending, by the management platform, the prompt information to both the gas company service sub-platform and the social operator service sub-platform.

Further, if the change of the data of the gas meter is not continuous within the preset observation duration, the management platform does not send the valve closing instruction.

According to a second aspect, the present invention provides an IoT system; the IoT system includes a user platform, a management platform, an object platform, a plurality of sensor network sub-platforms and service sub-platforms; the object platform is communicatively connected with the management platform via at least one of the plurality of sensor network sub-platforms; the management platform is communicatively connected with the service sub-platforms; the service sub-platforms are communicatively connected with the user platform; the object platform includes a gas meter; the service sub-platforms include at least one of a gas company service sub-platform, a government service sub-platform or a social operator service sub-platform; the user platform is configured to send a detection command to a service sub-platform, where the detection command includes a time period; each of the service sub-platforms is configured to send the detection command to the management platform; the management platform is configured to send a detection instruction to the gas meter via at least one of the plurality of sensor network sub-platforms according to the detection command; the gas meter is configured to send, in response to the detection instruction, gas data to the management platform via the sensor network sub-platform at a preset time interval within the time period; the management platform is configured to judge whether the gas data uploaded by the gas meter changes or not, and when the gas data changes, the management platform judges whether to send a valve closing instruction to the gas meter or not via at least one of the plurality of sensor network sub-platforms; and when receiving the valve closing instruction, the gas meter closes a valve in response to the valve closing instruction.

Further, the service sub-platforms include at least the gas company service sub-platform and the social operator service sub-platform, and when the time at which the gas data changes falls within a preset time range, the management platform sends the valve closing instruction to the gas meter via at least one of the plurality of sensor network sub-platforms, and the management platform sends prompt information to both the gas company service sub-platform and the social operator service sub-platform.

Further, the service sub-platforms include at least the gas company service sub-platform and the social operator service sub-platform; and that the management platform judges whether to send a valve closing instruction to the gas meter or not via at least one of the plurality of sensor network sub-platforms includes: the management platform judges whether or not the amount of change in the gas data is greater than a preset threshold; if the amount of change in the gas data is smaller than the threshold, the management platform sends query information to the user platform via a service sub-platform to query whether a user has used the gas or not, and judges, according to a response of the user platform to the query information, whether to send the valve closing instruction to the gas meter or not via at least one of the plurality of sensor network sub-platforms; if the amount of change in the gas data is greater than the threshold, the management platform sends the valve closing instruction to the gas meter via at least one of the plurality of sensor network sub-platforms; and when the management platform sends the valve closing instruction to the gas meter via at least one of the plurality of sensor network sub-platforms, the management platform sends the prompt information to both the gas company service sub-platform and the social operator service sub-platform.

Further, when the response of the user platform to the query information is that the gas hasn't been used, the management platform sends the valve closing instruction to the gas meter via at least one of the plurality of sensor network sub-platforms.

Further, if the user platform does not make a response to the query information within a preset duration, the management platform sends the valve closing instruction to the gas meter via at least one of the plurality of sensor network sub-platforms.

Further, the service sub-platforms include at least the gas company service sub-platform and the social operator service sub-platform; and that the management platform judges whether to send a valve closing instruction to the gas meter or not via at least one of the plurality of sensor network sub-platforms includes: the management platform judges whether the change of the data of the gas meter is continuous or not within a preset observation duration; if the change of the data of the gas meter is continuous, the management platform sends the valve closing instruction to the gas meter via at least one of the plurality of sensor network sub-platforms; and the management platform sends the prompt information to both the gas company service sub-platform and the social operator service sub-platform.

Further, if the change of the data of the gas meter is not continuous within the preset observation duration, the management platform does not send the valve closing instruction.

The present invention provides a gas leakage detection method based on a compound IoT and an IoT system. The method is applied to the IoT system; the IoT system includes a user platform, a management platform, an object platform, a plurality of sensor network sub-platforms and service sub-platforms; the object platform includes a gas meter; and the service sub-platforms include at least one of a gas company service sub-platform, a government service sub-platform or a social operator service sub-platform. The method includes: sending, by the user platform, a detection command to a service sub-platform, where the detection command includes a time period; sending, by the service sub-platform, the detection command to the management platform; sending, by the management platform, a detection instruction to the gas meter via at least one of the plurality of sensor network sub-platforms according to the detection command; in response to the detection instruction, sending, by the gas meter, gas data to the management platform via the sensor network sub-platform at a preset time interval within the time period; judging, by the management platform, whether the gas data uploaded by the gas meter changes or not, and when the gas data changes, judging, by the management platform, whether to send a valve closing instruction to the gas meter or not via at least one of the plurality of sensor network sub-platforms; and when receiving the valve closing instruction, closing, by the gas meter, a valve in response to the valve closing instruction. According to the gas leakage detection method based on the compound IoT and the IoT system provided by the invention, whether a gas pipeline of a user has gas leakage or not is remotely monitored and is judged via a user participation manner, the judgment manner is intelligent, the judgment result is accurate and thus the gas safety of the user is guaranteed.

To make the above objectives, characteristics and advantages of the present invention more apparent and understandable, preferred embodiments are set forth hereinafter and are described below in detail in combination with accompanying drawings.

BRIEF DESCRIPTION OF DRAWINGS

To make the objectives, technical solutions and advantages of the embodiments of the present invention clearer, a clear and complete description of the technical solutions in the present invention will be given below in combination with the accompanying drawings in the embodiments of the present invention. Apparently, the embodiments described below are a part, but not all, of the embodiments of the present invention. Generally, a component, described and illustrated in the accompanying drawings, in the embodiments of the present invention may be disposed and designed in various different configurations. Therefore, the following detailed description concerning the embodiments of the present invention and provided in the accompanying drawings is not intended to limit a claimed scope of the present invention, but merely represents selected embodiments of the present invention. All of the other embodiments, obtained by a person of ordinary skill in the art based on the embodiments of the present invention without any inventive efforts, fall into the protection scope of the present invention.

Figure 1:
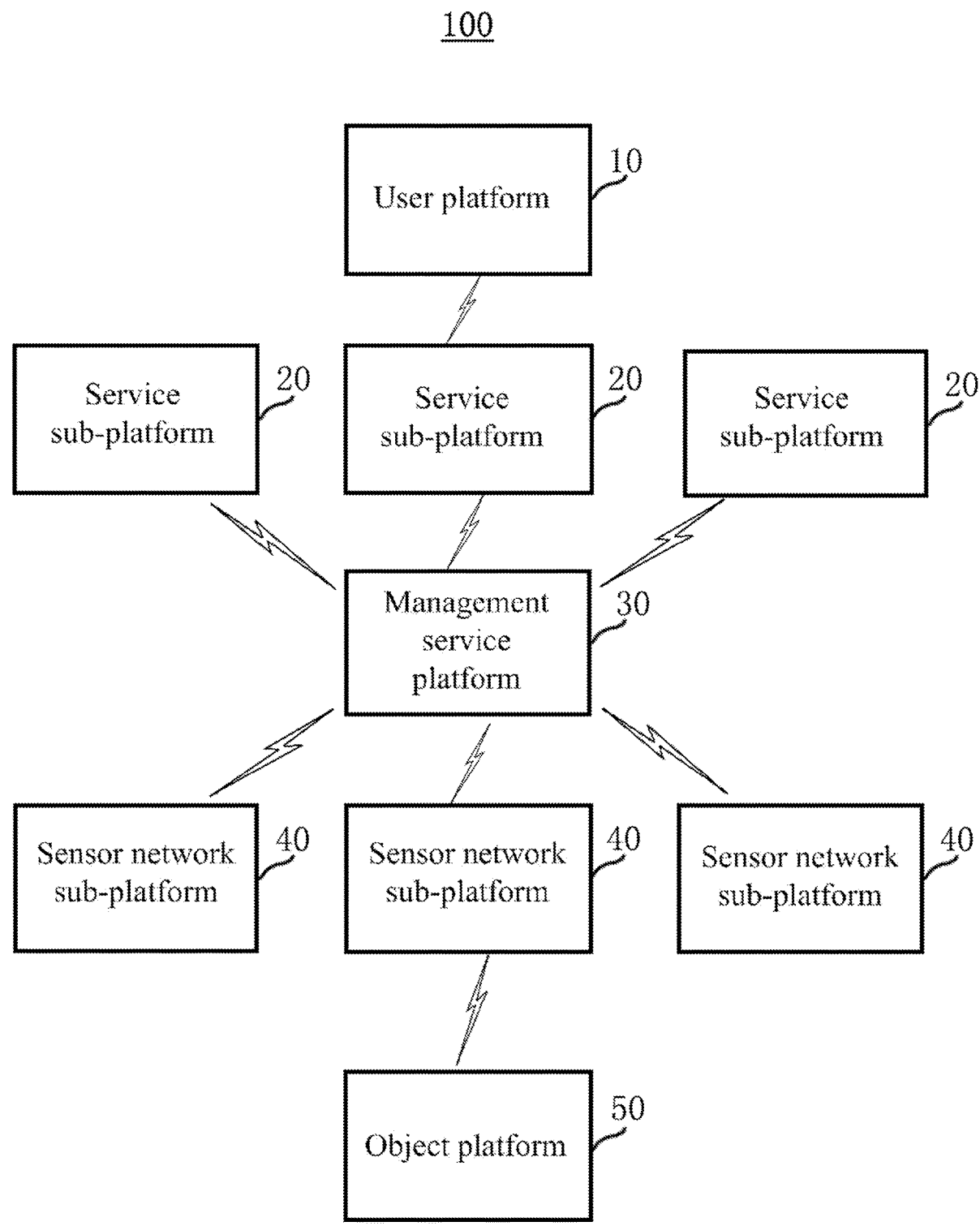
FIG. 1 illustrates a compositional schematic diagram of an IoT system provided by an embodiment of the present invention.

Numerals in the drawings: 100—IoT system; 10—user platform; 20—service sub-platform; 30—management platform; 40—sensor network sub-platform; 50—object sub-platform.

DESCRIPTION OF EMBODIMENTS

A clear and complete description of the technical solutions in the present invention will be given below in combination with the accompanying drawings in the embodiments of the present invention. Apparently, the embodiments described below are a part, but not all, of the embodiments of the present invention. Generally, a component, described and illustrated in the accompanying drawings, in the embodiments of the present invention may be disposed and designed in various different configurations. Therefore, the following detailed description concerning the embodiments of the present invention and provided in the accompanying drawings is not intended to limit a claimed scope of the present invention, but merely represents selected embodiments of the present invention. All of the other embodiments, obtained by those skilled in the art based on the embodiments of the present invention without any inventive efforts, fall into the protection scope of the present invention.

Referring to FIG. 1, a gas leakage detection method based on a compound IoT provided by an embodiment of the present invention is applied to an IoT system 100. The IoT system 100 includes a user platform 10, a plurality of service sub-platforms 20, a management platform 30, a plurality of sensor network sub-platforms 40 and an object platform 50. Herein, the object platform 10 may be communicatively connected with the management platform 30 via any one or more of the plurality of sensor network sub-platforms 40 to send data of the object platform 50 to the management platform 30, or receive a signal sent by the management platform 30. The management platform 30 is communicatively connected with the plurality of service sub-platforms 20. In this embodiment, the plurality of service sub-platforms 20 may include at least one of a gas company service sub-platform, a government service sub-platform or a social operator service sub-platform. Each of the service sub-platforms 20 is communicatively connected with the user platform 10, and is configured to receive information sent by the user platform 10, forward the information to the management platform 30, and push information sent by the management platform 30 to the user platform 10. The management platform 30 and the service sub-platforms 20 each may be a server. The object platform 50 includes a gas meter. The gas leakage detection method based on the compound IoT provided by the embodiment of the present invention is applied to detecting whether a gas pipeline of a user leaks or not.

Figure 2:
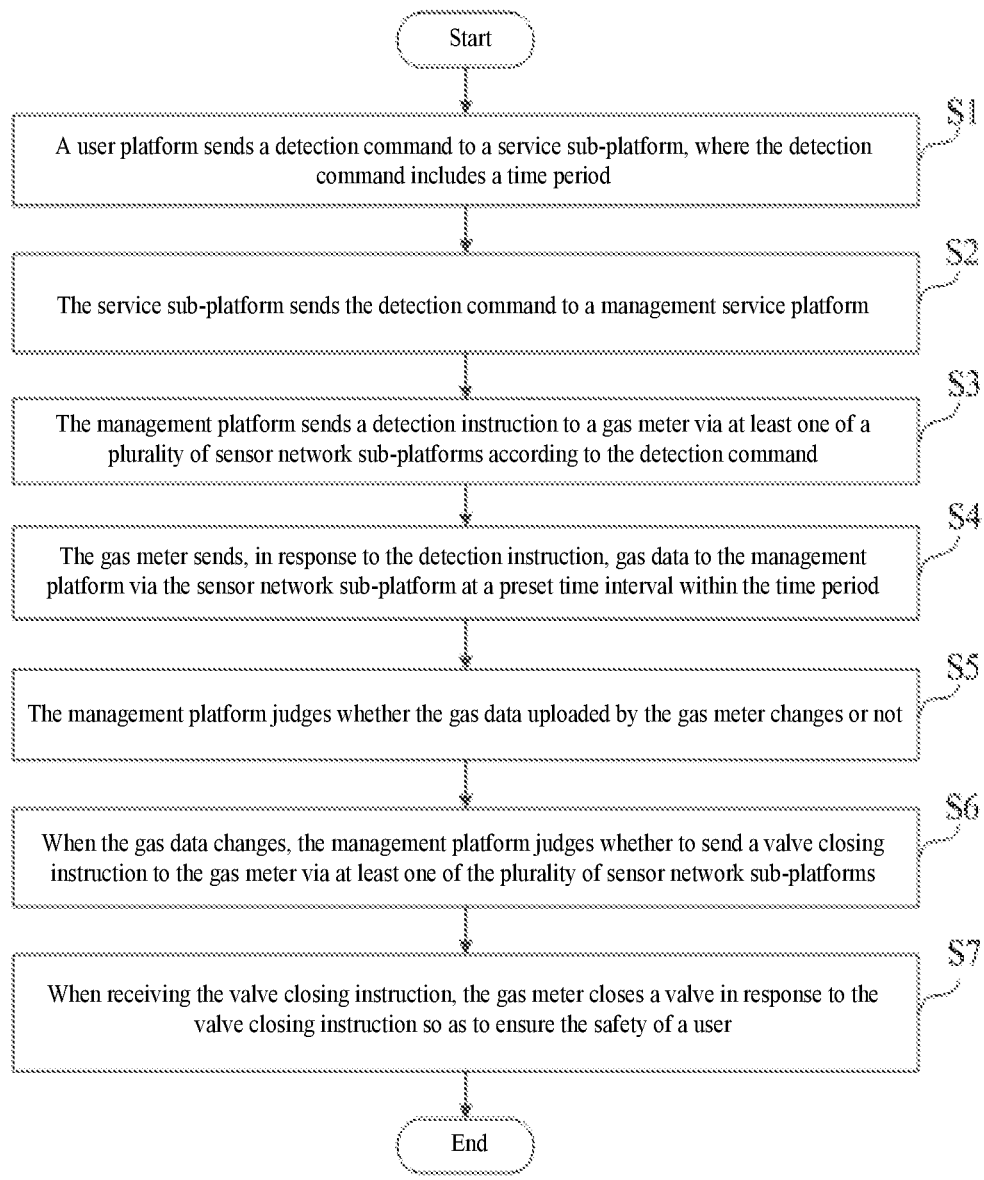
FIG. 2 illustrates a flowchart of a gas leakage detection method based on a compound IoT provided by an embodiment of the present invention.

Referring to FIG. 2, the gas leakage detection method based on the compound IoT includes the following steps:

Step S1, a user platform sends a detection command to a service sub-platform, where the detection command includes a time period.

Figure 3:
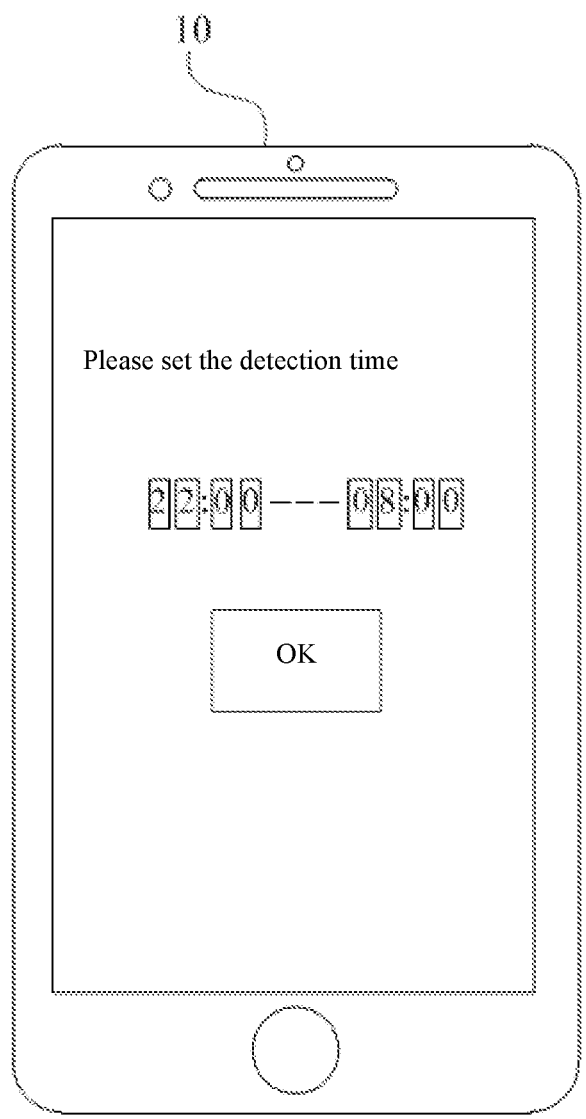
FIG. 3 illustrates a schematic diagram of an application scenario of a gas leakage detection method based on a compound IoT provided by an embodiment of the present invention.

In this embodiment, the user platform 10 may be a universal electronic device such as a Personal Computer (PC), a smartphone, a tablet computer, a Personal Digital Assistant (PDA), a Mobile Internet Device (MID), and the like. With a smartphone as an example, as shown in FIG. 3, after a user inputs a time period on the mobile phone and taps OK, the smartphone sends a detection command to a service sub-platform 20. Preferably, the service sub-platform 20 is a gas company service sub-platform. The detection command sent by the smartphone includes the time period set by the user, which indicates that the user will not use the gas within the time period. It is easily understood that the length of the time period may be freely set, and may be, for example, a time period of a day, and may also be a time period of a month or a time period of a year, which is not limited by this embodiment thereto. For example, in the figure, the time period set by the user is at night, and in this duration, the user may be in a sleep state and the gas is not used. In other embodiments, if the user needs to go out, a longer time period may be set, such as from July 1 to August 1.

Step S2, the service sub-platform sends the detection command to a management platform. In this embodiment, the gas company service sub-platform forwards the detection command to the management platform 30 to be processed by the management platform 30.

Step S3, the management platform sends a detection instruction to a gas meter via at least one of a plurality of sensor network sub-platforms according to the detection command.

In this embodiment, the sensor network sub-platforms 40 each may be a gateway. The management platform 30 communicates with the gas meter via a sensor network sub-platform 40. The management platform 30 generates a corresponding detection instruction according to the detection command. It is easily understood that the detection instruction includes the time period set by the user.

Step S4, the gas meter sends, in response to the detection instruction, gas data to the management platform via the sensor network sub-platform at a preset time interval within the time period.

The preset time interval may be determined based on the length of the time period. For example, when the length of the time period is short, the time interval may be set to be intensive, e.g., if the length of the time period is 8 hours, the time interval may be set to half an hour, i.e., the gas meter sends the gas data to the management platform 30 every half an hour; and when the length of the time period is long, the time interval may be set to be sparse, e.g., if the length of the time period is one month, the time interval may be set to 2 hours, i.e., the gas meter sends the gas data to the management platform 30 every two hours. In order to ensure the timely and accurate transmission of the gas data, the plurality of sensor network sub-platforms 40 are provided in this embodiment, so that when a sensor network sub-platform 40 is faulty, the gas data may be continuously transmitted via other standby sensor network sub-platforms 40.

Step S5, the management platform judges whether the gas data uploaded by the gas meter changes or not.

When the gas data uploaded by the gas meter is different from the previous gas data uploaded by the gas meter, it is judged by the management platform 30 that the gas data changes.

Step S6, when the gas data changes, the management platform judges whether to send a valve closing instruction to the gas meter via at least one of the plurality of sensor network sub-platforms.

Since it is agreed in advance that after the user platform 10 sends the detection command, the gas is no longer used by the user within the time period included in the detection command, if the gas data changes in the time period, it is generally understood that a gas pipeline of the user leaks. In this case, it is necessary to close a valve of the gas meter of the user to prevent an accident. However, it is not excluded that the gas data changes due to some accidental conditions, e.g., the user does not comply with the previous agreement, the gas is used in the set time period, or an error occurs in a sensor of the gas meter. Therefore, when the management platform 30 judges that the gas data changes, it is necessary to judge whether the change of the gas data is caused by the gas leakage or not, thereby judging whether the valve of the gas meter needs to be closed or not.

The manner in which the management platform 30 judges whether the valve closing instruction needs to be sent or not is described below.

When the time at which the gas data changes falls within the preset time range, the management platform 30 sends the valve closing instruction to the gas meter via at least one of the plurality of sensor network sub-platforms 40. The preset time range described herein may be set freely as required, and may be, for example, set to the time at which the user sleeps. The perception is reduced when the user sleeps, so in order to protect the safety of the user, the management platform 30 sends the valve closing instruction to the gas meter via the sensor network sub-platform 40 no matter what causes the change of the gas data. In this example, the service sub-platforms 20 include at least the gas company service sub-platform and the social operator service sub-platform. The management platform 30 sends prompt information to both the gas company service sub-platform and the social operator service sub-platform. The prompt information is sent to the gas company service sub-platform, so that a staff of a gas company can check and rectify the gas leakage after knowing the situation. The social operator service sub-platform may be a server of the responsible unit (property management center) of an area (residence community) where the user is located. The prompt information is sent to the social operator service sub-platform, so that the responsible unit (property management center) can confirm the safety of the user and make arrangement for maintenance.

Figure 4:
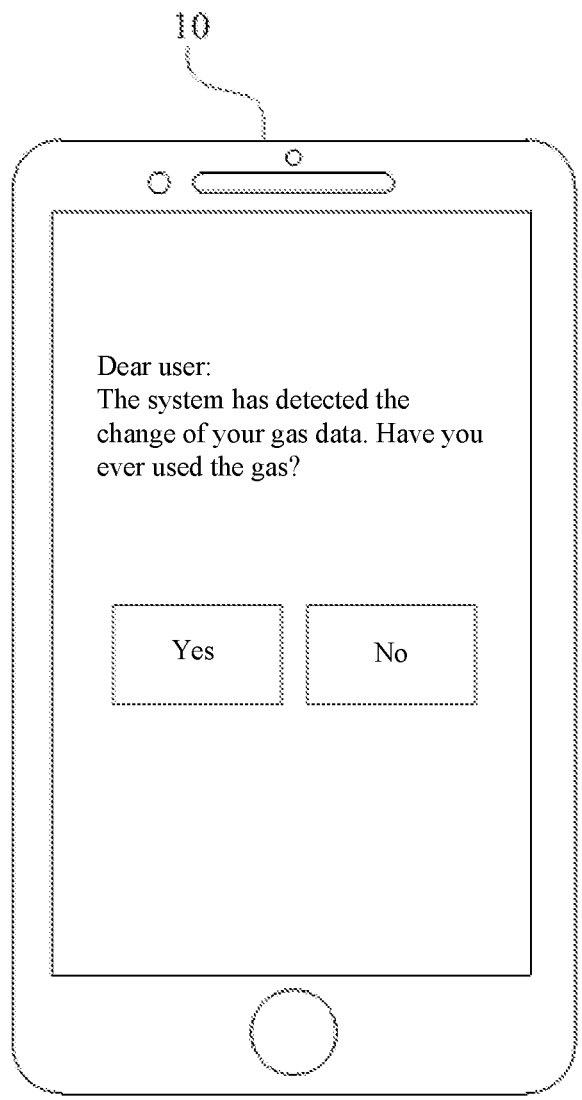
FIG. 4 illustrates a schematic diagram of an application scenario of a gas leakage detection method based on a compound IoT provided by an embodiment of the present invention.

As another implementation manner, when the gas data changes, the management platform 30 judges whether or not the amount of change in the gas data is greater than a preset threshold. The threshold does not affect the normal life and life safety of the user, and may be set based on a residence area of the user. If the amount of change in the gas data is smaller than the threshold, the management platform 30 sends query information to the user platform 10 via a service sub-platform 20 to query whether the user has used the gas or not, and judges, according to a response of the user platform to the query information, whether to send the valve closing instruction to the gas meter or not via at least one of the plurality of sensor network sub-platforms 40. As shown in FIG. 4, after the user platform 10 receives the query information, the interface shown in the figure may be generated to ask whether the user has used the gas or not. If the user taps "Yes", it is indicated that the user has used the gas. If the user taps "No", it is indicated that the user hasn't used the gas. If the user taps "No", it is indicated that the user hasn't used the gas within the time period. However, the gas data changes, and the management platform 30 judges that the gas pipeline of the user leaks. In this case, the management platform 30 sends the valve closing instruction to the gas meter via the at least one of the plurality of sensor network sub-platforms 40. If the user taps "Yes", it is indicated that the user has used the gas within the time period, and the management platform 30 cancels the previous monitoring data and restarts to receive and analyze the gas data. If the amount of change in the gas data is greater than the threshold and thus the personal safety of the user may be affected, the management platform 30 sends the valve closing instruction to the gas meter via at least one of the plurality of sensor network sub-platforms. At the same time, the management platform 30 sends the prompt information to both the gas company service sub-platform and the social operator service sub-platform.

If the user platform 10 does not make a response to the query information within a preset duration, it may be indicated that the query information is not read by the user. In order to ensure the personal safety of the user, the management platform 30 sends the valve closing instruction to the gas meter via at least one of multiple sensor network sub-platforms 40. At the same time, the management platform 30 sends the prompt information to both the gas company service sub-platform and the social operator service sub-platform.

As another implementation manner, when the gas data changes, the management platform 30 judges whether the change of the gas data is continuous or not within a preset observation duration, and if yes, the management platform 30 sends the valve closing instruction to the gas meter via at least one of the plurality of sensor network sub-platforms 40. The management platform 30 sends the prompt information to both the gas company service sub-platform and the social operator service sub-platform. Because gas leakage is a slow and continuous process, in this embodiment, whether the change of gas data is continuous or not within the observation duration is judged, and if so, it is indicated that there is gas leakage. In order to ensure the accuracy, whether or not the amount of change in the gas data in a unit time is smaller than a preset amount of change may further be judged in practical application. If the amount of change in the gas data in the unit time is smaller than the preset amount of change and the change is continuous, it may be judged that there is gas leakage. It is easily understood that if the change of the data of the gas meter is not continuous within the preset observation duration, the management platform 30 does not send the valve closing instruction.

The above-described manner in which the management platform 30 judges whether to send the valve closing instruction or not is merely an example of the embodiment of the present invention. In other embodiments, it may be judged in other judgment manners, which is not limited by the present invention thereto.

Step S7, when receiving the valve closing instruction, the gas meter closes a valve in response to the valve closing instruction, so as to ensure the safety of a user.

In conclusion, the present invention provides a gas leakage detection method based on a compound IoT and an IoT system. The method is applied to the IoT system; the IoT system includes a user platform, a management platform, an object platform, a plurality of sensor network sub-platforms and service sub-platforms; the object platform includes a gas meter; and the service sub-platforms include at least one of a gas company service sub-platform, a government service sub-platform or a social operator service sub-platform. The gas leakage detection method based on the compound IoT includes: the user platform sends a detection command to a service sub-platform, where the detection command includes a time period; the service sub-platform sends the detection command to the management platform; the management platform sends a detection instruction to the gas meter via at least one of the plurality of sensor network sub-platforms according to the detection command; the gas meter sends, in response to the detection instruction, gas data to the management platform via the sensor network sub-platform at a preset time interval within the time period; the management platform judges whether the gas data uploaded by the gas meter changes or not; when the gas data changes, the management platform judges whether to send a valve closing instruction to the gas meter via at least one of the plurality of sensor network sub-platforms; and when receiving the valve closing instruction, the gas meter closes a valve in response to the valve closing instruction. According to the gas leakage detection method based on the compound IoT and the IoT system provided by the present invention, whether a gas pipeline of a user has gas leakage or not is remotely monitored and is judged via a user participation manner, the judgment manner is intelligent, the judgment result is accurate and thus the gas safety of the user is guaranteed.

The above are merely preferred embodiments of the present invention, and are not intended to limit the present invention. A person skilled in the art may make various modifications and changes to the present invention. Any modification, equivalent replacement, improvement and the like made within the spirit and principle of the present invention all shall be included in a scope of protection of the present invention. It should be noted that similar reference numerals and letters refer to similar items in the following drawings, and thus once an item is defined in one drawing, it does not need to be further defined and explained in the subsequent drawings.

What is claimed is:

1. A gas leakage detection method based on a compound Internet of Things (IoT) that includes multiple devices connected wirelessly via the Internet, wherein the method is applied to an IoT system; the IoT system comprises a user platform, a management platform, an object platform, a plurality of sensor network sub-platforms and service sub-platforms; the object platform comprises a gas meter; the service sub-platforms comprise at least one of a gas company service sub-platform, a government service sub-platform or a social operator service sub-platform; and the method comprises:

sending, by the user platform, a detection command to a service sub-platform, wherein the detection command comprises a time period;

sending, by the service sub-platform, the detection command to the management platform;

sending, by the management platform, a detection instruction to the gas meter via at least one of the plurality of sensor network sub-platforms according to the detection command;

in response to the detection instruction, sending, by the gas meter, gas usage data to the management platform via the sensor network sub-platforms at a preset time interval within the time period;

and determining, by the management platform, whether to send a valve closing instruction based on the gas usage data uploaded by the gas meter;

wherein the determining whether to send the valve closing instruction includes: judging, by the management platform, whether the gas usage data uploaded by the gas meter changes or not during the time period, and when the gas usage data changes, judging, by the management platform, whether to send the valve closing instruction to the gas meter or not via at least one of the plurality of sensor network sub-platforms;

and when receiving the valve closing instruction, closing, by the gas meter, a valve in response to the valve closing instruction.

2. The gas leakage detection method based on the compound IoT according to claim 1, wherein the service sub-platforms comprise at least the gas company service sub-platform and the social operator service sub-platform; and the step of when the gas usage data changes, judging, by the management platform, whether to send a valve closing instruction to the gas meter or not via at least one of the plurality of sensor network sub-platforms comprises:

when the time at which the gas usage data changes falls within a preset time range, sending, by the management platform, the valve closing instruction to the gas meter via at least one of the plurality of sensor network sub-platforms; and sending, by the management platform, prompt information to both the gas company service sub-platform and the social operator service sub-platform.

3. The gas leakage detection method based on the compound IoT according to claim 1, wherein the service sub-platforms comprise at least the gas company service sub-platform and the social operator service sub-platform; and the step of judging, by the management platform, whether to send a valve closing instruction to the gas meter or not via at least one of the plurality of sensor network sub-platforms comprises:

judging, by the management platform, whether or not the amount of change in the gas usage data is greater than a preset threshold;

if the amount of change in the gas usage data is smaller than the threshold, sending, by the management platform, query information to the user platform via a service sub-platform to query whether a user intentionally consumed any gas, and judging, according to a response of the user platform to the query information, whether to send the valve closing instruction to the gas meter or not via at least one of the plurality of sensor network sub-platforms;

if the amount of change in the gas usage data is greater than the threshold, sending, by the management platform, the valve closing instruction to the gas meter via at least one of the plurality of sensor network sub-platforms; and when the management platform sends the valve closing instruction to the gas meter via at least one of the plurality of sensor network sub-platforms, sending, by the management platform, the prompt information to both the gas company service sub-platform and the social operator service sub-platform.

4. The gas leakage detection method based on the compound IoT according to claim 2, wherein when the response of the user platform to the query information indicates that no gas was intentionally consumed by the user, the management platform sends the valve closing instruction to the gas meter via at least one of the plurality of sensor network sub-platforms.

5. The gas leakage detection method based on the compound IoT according to claim 2, wherein if the user platform does not make a response to the query information within a preset duration, the management platform sends the valve closing instruction to the gas meter via at least one of the plurality of sensor network sub-platforms.

6. The gas leakage detection method based on the compound IoT according to claim 1, wherein the service sub-platforms comprise at least the gas company service sub-platform and the social operator service sub-platform; and the step of judging, by the management platform, whether to send a valve closing instruction to the gas meter or not via at least one of the plurality of sensor network sub-platforms comprises:

judging, by the management platform, whether the change of the gas usage data continues or not within a preset observation duration; if the change of the gas usage data continues, sending, by the management platform, the valve closing instruction to the gas meter via at least one of the plurality of sensor network sub-platforms; and sending, by the management platform, the prompt information to both the gas company service sub-platform and the social operator service sub-platform.

7. The gas leakage detection method based on the compound IoT according to claim 5, wherein if the change of the gas usage data of the gas meter stops within the preset observation duration, the management platform does not send the valve closing instruction.

8. An Internet of Things (IoT) system that includes multiple devices connected wirelessly via the Internet, wherein the IoT system comprises a user platform, a management platform, an object platform, a plurality of sensor network sub-platforms and service sub-platforms; the object platform is communicatively connected with the management platform via at least one of the plurality of sensor network sub-platforms; the management platform is communicatively connected with the service sub-platforms; the service sub-platforms are communicatively connected with the user platform; the object platform comprises a gas meter; and the service sub-platforms comprise at least one of a gas company service sub-platform, a government service sub-platform or a social operator service sub-platform, wherein:

the user platform is configured to send a detection command to a service sub-platform, wherein the detection command comprises a time period;

each of the service sub-platforms is configured to send the detection command to the management platform;

the management platform is configured to send a detection instruction to the gas meter via at least one of the plurality of sensor network sub-platforms according to the detection command;

the gas meter is configured to send, in response to the detection instruction, gas usage data to the management platform via the sensor network sub-platforms at a preset time interval within the time period;

and the management platform is configured to determine whether to send a valve closing instruction based on the gas usage data uploaded by the gas meter;

wherein the management platform is configured to judge whether the gas usage data uploaded by the gas meter changes or not during the time period, and when the gas usage data changes, the management platform judges whether to send a valve closing instruction to the gas meter or not via at least one of the plurality of sensor network sub-platforms; and when receiving the valve closing instruction, the gas meter closes a valve in response to the valve closing instruction.

9. The IoT system according to claim 8, wherein the service sub-platforms comprise at least the gas company service sub-platform and the social operator service sub-platform, and when the time at which the gas usage data changes falls within a preset time range, the management platform sends the valve closing instruction to the gas meter via at least one of the plurality of sensor network sub-platforms, and the management platform sends prompt information to both the gas company service sub-platform and the social operator service sub-platform.

10. The IoT system according to claim 8, wherein the service sub-platforms comprise at least the gas company service sub-platform and the social operator service sub-platform; and that the management platform judges whether to send a valve closing instruction to the gas meter or not via at least one of the plurality of sensor network sub-platforms comprises:

the management platform judges whether or not the amount of change in the gas usage data is greater than a preset threshold;

if the amount of change in the gas usage data is smaller than the threshold, the management platform sends query information to the user platform via a service sub-platform to query whether a user intentionally consumed any gas, and judges, according to a response of the user platform to the query information, whether to send the valve closing instruction to the gas meter or not via at least one of the plurality of sensor network sub-platforms;

if the amount of change in the gas usage data is greater than the threshold, the management platform sends the valve closing instruction to the gas meter via at least one of the plurality of sensor network sub-platforms; and when the management platform sends the valve closing instruction to the gas meter via at least one of the plurality of sensor network sub-platforms, the management platform sends the prompt information to both the gas company service sub-platform and the social operator service sub-platform.

11. The IoT system according to claim 10, wherein when the response of the user platform to the query information indicates that no gas was intentionally consumed by the user, the management platform sends the valve closing instruction to the gas meter via at least one of the plurality of sensor network sub-platforms.

12. The IoT system according to claim 10, wherein if the user platform does not make a response to the query information within a preset duration, the management platform sends the valve closing instruction to the gas meter via at least one of the plurality of sensor network sub-platforms.

13. The IoT system according to claim 8, wherein the service sub-platforms comprise at least the gas company service sub-platform and the social operator service sub-platform; and that the management platform judges whether to send a valve closing instruction to the gas meter or not via at least one of the plurality of sensor network sub-platforms comprises:

the management platform judges whether the change of the gas usage data of the gas meter continues or not within a preset observation duration; if the change of the gas usage data of the gas meter continues, the management platform sends the valve closing instruction to the gas meter via at least one of the plurality of sensor network sub-platforms; and the management platform sends the prompt information to both the gas company service sub-platform and the social operator service sub-platform.

14. The IoT system according to claim 13, wherein if the change of the gas usage data of the gas meter stops within the preset observation duration, the management platform does not send the valve closing instruction.

\* \* \* \* \*